United States Patent [19]

Negishi et al.

[11] Patent Number: 5,450,164
[45] Date of Patent: Sep. 12, 1995

[54] ELECTROPHOTOGRAPHIC IMAGING DEVICE WITH MARKING FUNCTION

[75] Inventors: Kiyoshi Negishi; Yoshimi Saito, both of Tsurugashima, Japan

[73] Assignee: Asahi Kogaku Kogyo Kabushiki Kaisha, Tokyo, Japan

[21] Appl. No.: 261,015

[22] Filed: Jun. 14, 1994

Related U.S. Application Data

[63] Continuation of Ser. No. 4,117, Jan. 13, 1993, abandoned.

[30] Foreign Application Priority Data

Jan. 14, 1992 [JP] Japan .................. 4-010035

[51] Int. Cl.6 ............................................ G03G 21/00
[52] U.S. Cl. ....................................... 355/203; 355/316
[58] Field of Search ............... 355/200, 203, 308, 309, 355/311, 316

[56] References Cited

U.S. PATENT DOCUMENTS

| | | | |
|---|---|---|---|
| 4,949,104 | 8/1990 | Negoro et al. | 355/316 X |
| 4,963,941 | 10/1990 | Negishi et al. | 355/282 |
| 5,063,416 | 11/1991 | Honda et al. | 355/316 |
| 5,077,576 | 12/1991 | Stansfield et al. | 355/203 X |
| 5,138,465 | 8/1992 | Ng et al. | 355/200 X |
| 5,194,903 | 3/1993 | Negishi et al. | 355/316 |

*Primary Examiner*—Fred L. Braun
*Attorney, Agent, or Firm*—Sandler, Greenblum & Bernstein

[57] ABSTRACT

An electrophotographic imaging device employs a continuous form sheet having a plurality of segments divided by perforations. An image is formed on a predetermined area of each of the segments in accordance with image data. It is discriminated whether an image is printed, in accordance with the image data, on a segment of the continuous form sheet which is to be discharged out of the imaging device. If it is discriminated that the segment is discharged without an image being printed in accordance with image data, a pair of marks are printed on the segment. The discriminating mechanism and the mark printing mechanism can be disabled when a page length of a sheet of the continuous form sheet has a predetermined value.

22 Claims, 5 Drawing Sheets

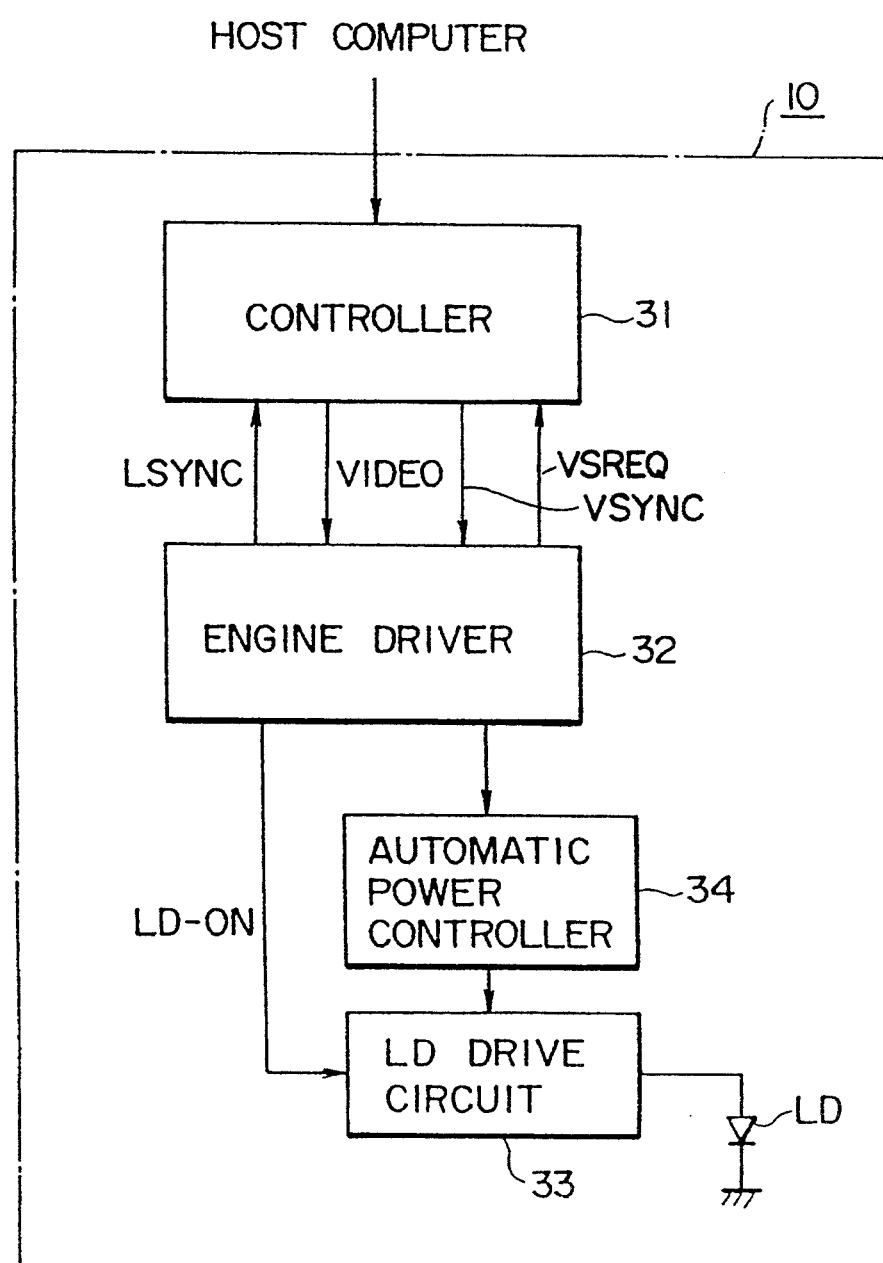

ELECTROPHOTOGRAPHIC IMAGING DEVICE WITH MARKING FUNCTION

This application is a continuation of application Ser. No. 08/004,117, filed Jan. 13, 1993, now abandoned.

BACKGROUND OF THE INVENTION

The present invention relates to an electrophotographic imaging device employing a continuous form sheet which has a plurality of segments divided by perforations. In this kind of imaging device. e.g., a laser beam printer or the like, an image is formed on a predetermined area of each of the segments in accordance with the image data.

Conventionally, in an electrophotographic printer, the following image Forming steps are performed:

(1) A uniformly charged circumferential surface of a photoconductive drum is exposed to light in order to form a latent image;
(2) By adhering toner, the latent image is developed to a toner image;
(3) The toner image is transferred onto a recording sheet at a transfer unit; and
(4) The transferred image is fixed by a fixing unit.

In such a printer, printing operation is executed on a page basis. Accordingly, if a continuous form sheet, having a plurality of pages defined by perforations, is employed as a recording medium, an image is formed on a predetermined area of each page. When the printing operation is completed and the printer is set into a stand-by state, feeding of the continuous form sheet is stopped such that the perforation is located at a fixing position. At this stage, if the distance between the fixing position and a transferring position does not correspond to the length of a page of the sheet, there would be a blank page on which no image is printed between the fixing unit and the transferring unit. With this condition, if the succeeding printing operation is restarted, the blank page is discharged from the printer as it is.

A common problem with such a printer is that it is difficult to determine whether the discharged page is not printed due to the pause between two different printing operations, or due to some trouble in the printing operation.

SUMMARY OF THE INVENTION

It is therefore an object of the present invention to provide an improved electrophotographic imaging device with which it can be distinguished whether the discharged blank page is made due to the pause between the two subsequent printing operations.

For the above object, according to the present invention, there is provided an electrophotographic imaging device employing a continuous form sheet. The continuous form sheet has a plurality of segments divided by perforations. An image is formed on a predetermined area of each of said segments in accordance with image data. The imaging device includes the following:

a device for discriminating whether an image is printed, in accordance with the image data, on a segment of the continuous form sheet, which is to be discharged out of the imaging device; and
a device for marking the segment if it is discriminated that the segment is discharged without any image being printed in accordance with the image data.

There can be various ways of marking a segment of the continuous form sheet. For example, the marking a device prints a predetermined image on the segment. Preferably, the predetermined image is printed out of the predetermined area.

The predetermined image can be printed with use of various methods, such as a method using a stamping device or the electrophotographic image forming method.

Optionally, since the page length of the sheet corresponds to the distance between the fixing unit and a transfer unit, the imaging device can be constructed not to produce a blank page. In such an imaging device, there can be provided means for disabling the discriminating device and the marking device when the page length of a sheet loaded in the imaging device is a predetermined value.

According to a further aspect of the invention, there is provided an electrophotographic imaging device employing a continuous form sheet. The continuous form sheet has a plurality of segments divided by perforations. An image is formed on a predetermined area of each of the segments in accordance with the image data. The imaging device includes the following:

a device for discriminating whether a segment of the continuous form sheet is to be discharged out of the imaging device in a predetermined condition; and
a device for marking the segment if it is discriminated that the segment is discharged in the predetermined condition.

DESCRIPTION OF THE ACCOMPANYING DRAWINGS

FIG. 2 is a block diagram of the control system of the printer of the present invention;

DESCRIPTION OF THE EMBODIMENTS

Figure 3:
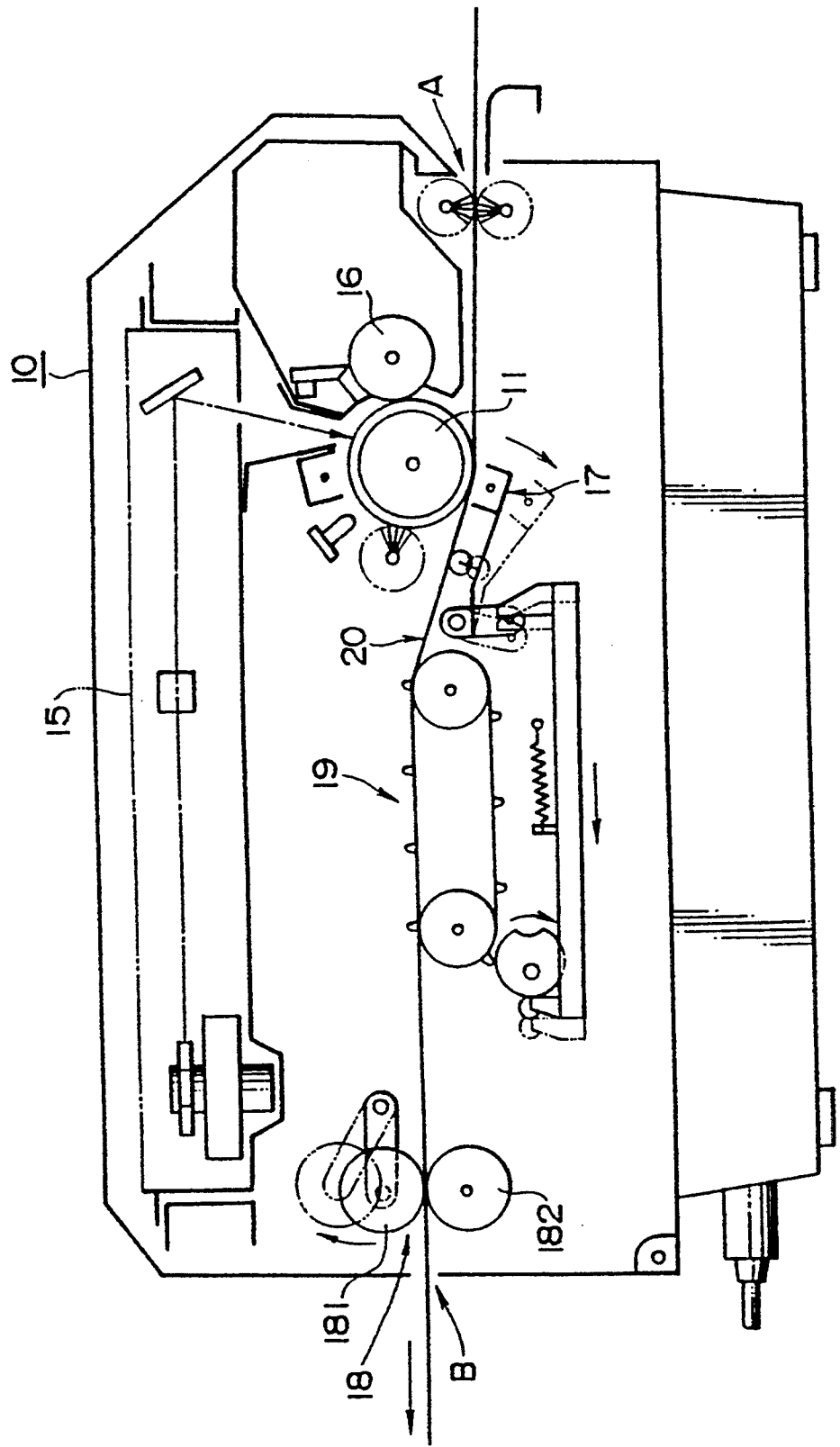
FIG. 3 is a schematic side view of the printer embodying the present invention.

FIG. 3 is a schematic side view of an electrophotographic printer 10 embodying the present invention. In the electrophotographic printer 10, a uniformly charged circumferential surface of a photoconductive drum 11 is exposed to light which is modulated in accordance with image information, and outputted by a laser scanning unit 15. Thus, a latent image is formed on the circumferential surface of the photoconductive drum 11. The latent image is developed to a toner image in a developing unit 16. The toner image is transferred onto a fan-fold sheet 20 used as a recording sheet in the transfer unit 17. The toner image, transferred on the fan-fold sheet 20, is fixed thereon at the fixing unit 18. In the electrophotographic printer 10, embodying the present invention, the fixing unit 18 is arranged apart from the transfer unit 17 by eleven inches.

On the fan-fold sheet 20, transverse perforations are formed at a predetermined interval in the feeding direction of the sheet 20, thereby segments, or pages are defined. The electrophotographic printer 10 is a so-called page printer, which prints images on a recording medium page by page, or segment by segment. In FIGS. 1A through 1E, the transverse perforations are indicated with numerals N11, N12 and the segments are indicated with numerals 21 through 24.

In the printer 10, a pair of fixing rollers 181 and 182 of the fixing unit 18 rotate with the fan-fold sheet 20 nipped therebetween. The rotation of the fixing rollers 181 and 182, and further the movement of a tractor 19, the fan-fold sheet 20 is fed from an inlet A to an outlet B by way of the transfer unit 17, the tractor 19 and the fixing unit 18.

FIG. 2 is a block diagram of the control system of the printer 10. Image information corresponding to each segment or page of the fan-fold sheet 20 is inputted to a controller 31 from a not-shown host computer on a page basis. To the controller, a horizontal synchronous signal LSYNC is transmitted from an engine driver 32. Further, from the engine driver 32, a vertical synchronous signal requesting signal VSREQ is transmitted to the controller 31. In response to the VSREQ, a vertical synchronous signal is transmitted from the controller 31 to the engine driver 32. Further, from the controller 31, a video signal is transmitted to the engine driver 32. The video signal is generated in accordance with the image information transmitted from the host computer. The photoconductive drum 11 is exposed to the light in accordance with the video signal, synchronously, with the vertical/horizontal synchronous signals LSYNC and VSYNC.

In the above embodiment, the controller 31 outputs the vertical synchronous signal VSYNC. However, it is not limited to the above-described system. That is, it is also possible to constitute the system such that the engine driver transmits the vertical and horizontal synchronous signals to the controller, and synchronously with the horizontal and vertical synchronous signals, the controller outputs the video signal.

With the controller 31, an operation panel (not-shown) is connected. A type of the fan-fold sheet, e.g., length of the segment of the fan-fold sheet, the number of copies, and the various setting items are inputted through keys provided on the operation panel.

The engine driver 32 generates an LD-ON signal in order to drive a laser diode LD, in the laser scanning unit 15, in accordance with the video signal, and transmits the LD-ON signal to an LD driving circuit 33. Further, the engine driver 32 adjusts the power of the laser diode LD by means of an auto power controller 34.

Furthermore, the engine driver 32 controls the rotation of the photoconductive drum 11, developing operation of the developing unit 16, transfer operation executed by the transfer unit 17, and feeding operation of the fan-fold sheet 20, as well as the fixing operation of the fixing unit 18. In the printer 10, a well-known device such as an encoder, for detecting the feeding amount of the fan-fold sheet 20, is provided.

In the above-described printer 10, the engine driver 32, the LD driving circuit 33, the laser scanning unit 15 including the laser diode LD, the photoconductive drum 11, the developing unit 16, the transfer unit 17, and the fixing unit function as marking means.

Figure 1A:
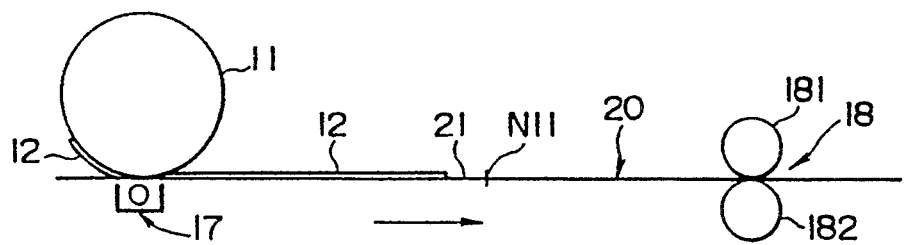
FIGS. 1A through 1E show feeding conditions of a continuous form recording sheet in a printer embodying the present invention.

In the printer 10 described above, as the fan-fold sheet 20 is fed by the pair of rollers 181 and 182, and the tractor unit 19, the toner images are transferred onto respective pages 21 and 22 of the fan-fold sheet 20 by the transfer unit 17, as shown in FIG. 1A. The transferred images are fixed by the fixing unit 18.

In the printer 10, embodying the present invention, the distance between the transfer unit 17 and the fixing unit 28 is 11 inches.

Figure 1B:
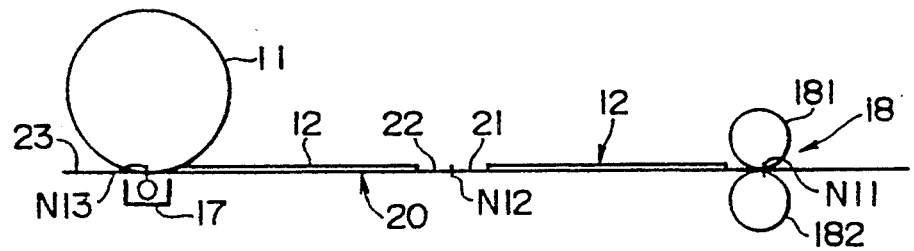

As shown in FIG. 1B, if the page length of the fan-fold sheet is 11 inches or 5.5 inches, when a toner image 12 has been transferred to page 22, the transverse perforation N11 is positioned at the fixing unit 18, while the transverse perforation N13, formed between pages 22 and 23, is positioned on the slightly upstream side of the transfer unit 17.

Accordingly, if the page length of the fan-fold sheet 20, loaded in the printer 10, is 11 inches or 5.5 inches, when one print sequence has been completed and the printer 10 is to be in the stand-by state, the feeding operation of the fan-fold sheet 20 is stopped after the toner image 12 has been transferred onto the segment 22. FIG. 1B shows this condition. That is, immediately after the toner image 12 has been transferred onto the segment, or page 22, the feeding operation is stopped. At this stage, a portion on which the toner image is not transferred, i.e., a transverse perforation N11, is positioned substantially at the fixing unit 18. Further, the succeeding transverse perforation N12, which is formed between a segment 22 and the following segment 23, is positioned on slightly upstream side of the transfer unit 17 and the photoconductive drum 1. In this case, as shown in FIG. 1B, the segment(s) bearing unfixed toner image remains inside the printer 10 between the fixing unit 18 and the transfer unit.

As described above, if the page length of the fan-fold sheet 20 is 11 inches, or 5.5 inches, the feeding operation of the fan-fold sheet 20 is stopped, under the control of the engine driver 32, when one sequence of printing operation is completed and the last toner image in the printing operation has been transferred onto a segment of the fan-fold sheet 20. Thus, the printer 10 is in the stand-by state. When the following printing operation starts, the first toner image in the following printing operation is transferred onto the following segment 23.

If the page length of the fan-fold sheet 20 is not 11 inches or 5.5 inches, the following control is performed.

Figure 1C:
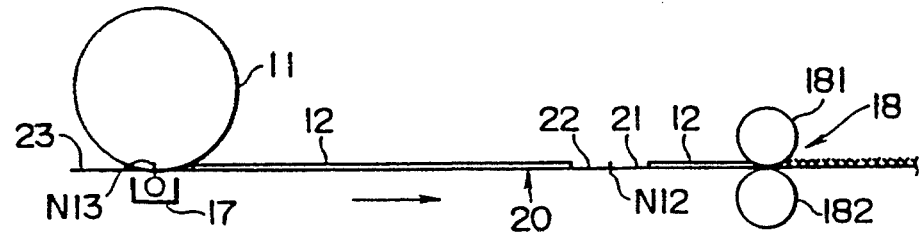

FIG. 1C shows an example of such a case. In this case it is assumed that the page length is greater than 5.5 inches, and shorter than 11 inches. In this case, when the toner image 12 has been transferred onto the segment 22, the toner image 12, on a segment 21, is located at the fixing unit 18.

Figure 1D:
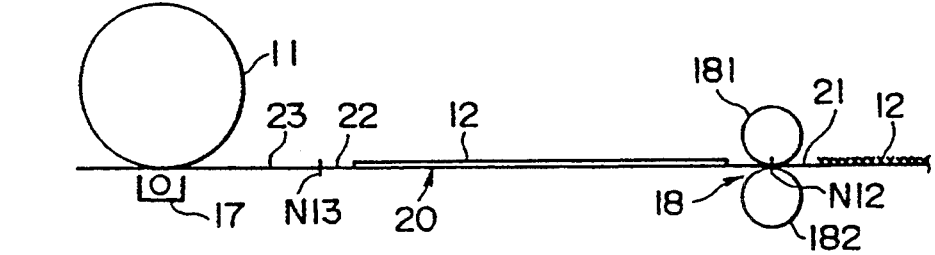

In this case, the fan-fold sheet 20 is further fed so that the unfixed toner image 12, on the segment 21, passes through the fixing unit 18 and is fixed, and that the transverse perforation N12 is located at the fixing unit 18, as shown in FIG. 1D. At this stage, the engine driver 32 controls to stop the fan-fold sheet 20.

If the printing operation is restarted in the above state, since the leading end of the segment 23 has been passed through the photoconductive drum 11 and the transfer unit 17, the printing operation is performed on the segment 24. Namely, when the printing operation is restarted, the fan-fold sheet 20 is fed, and the timing of the exposure operation of the photoconductive drum 11 is adjusted so that the latent image is formed on the portion of the circumferential surface of the photoconductive drum 11 corresponding to the segment 24.

Figure 1E:
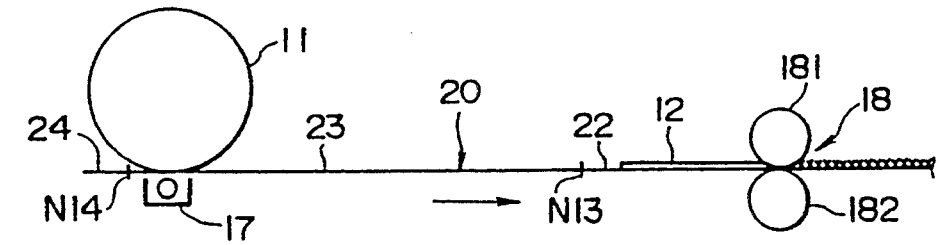

As described above, if the page length of the fan-fold sheet 20 is not 11 inches, or 5.5 inches, when the printing operation is executed after the printer 10 is in the stand-by state, a blank segment, e.g., the segment 23 in FIG. 1E, which carries no image, is discharged out of the printer 10. The blank segment may be formed due to the malfunction of the printer 10. Accordingly, if the blank page is discharged out of the printer, it becomes necessary for an operator to examine whether the blank page is discharged due to the pause between two printing operation or due to the malfunction of the printer 10. It sometimes would be a troublesome work for the operator.

In this regard, in the printer 10 embodying the present invention, when the printer 10 becomes in the stand-by state, if a segment of the fan-fold sheet 20 passes through the transfer unit 17 and at the photoconductive drum 11 without carrying images, an LD-ON signal is generated in the engine driver 32. When the LD-ON signal is generated, predetermined images are formed on the photoconductive drum 11, which are transferred onto the blank segment as shown in FIG. 4, as marks M.

Figure 4:
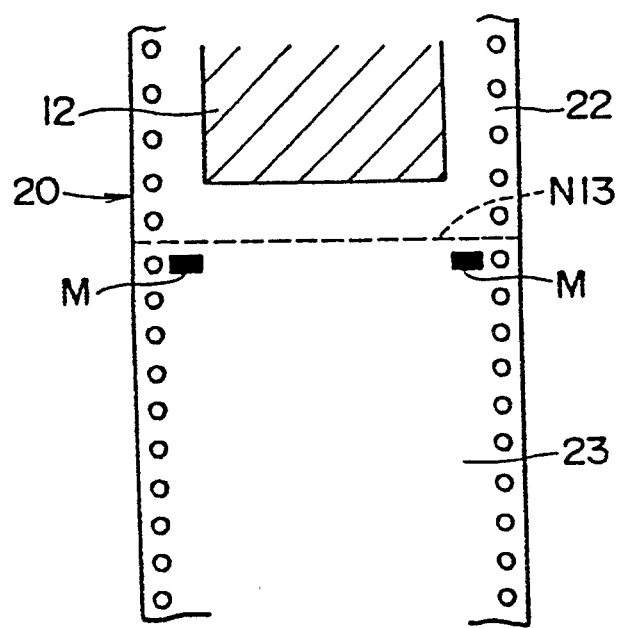
FIG. 4 shows a blank page of a fan-fold sheet on which a pair or marks are printed.

Thus, as shown in FIG. 4, on the segment 22 side of the segment 23, a pair of rectangles M and M are printed. The portion on which the pair of rectangles are printed is out of an imaging area corresponding to an image formed in accordance with the image information.

Figure 5:
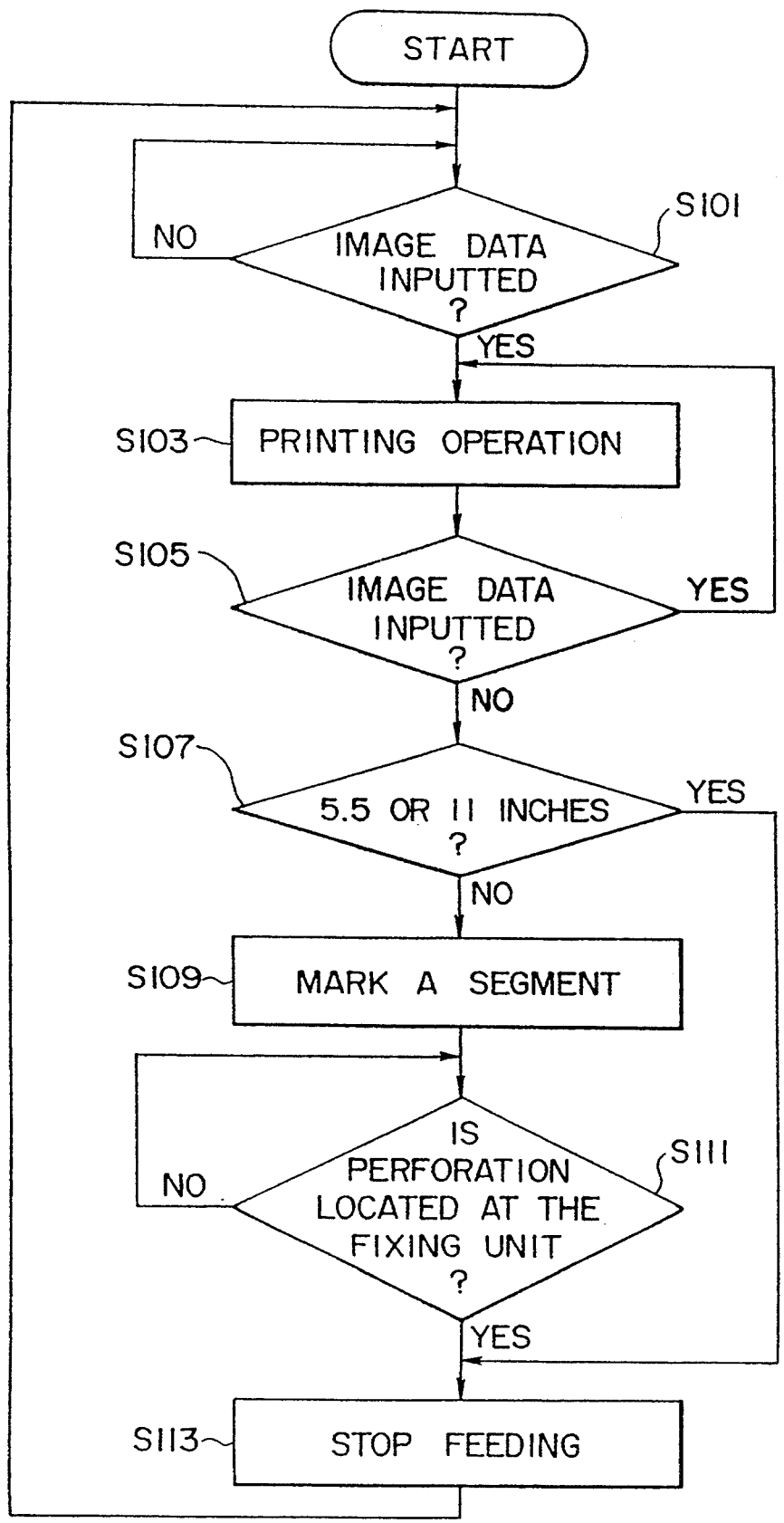
FIG. 5 is a flowchart illustrating the printing operation of the printer according to the present invention.

FIG. 5 is a flowchart illustrating the printing operation including the above-described marking operation.

The controller 31 monitors presence/absence of the image information from the host computer or the like (S101). If the image information is inputted in the controller 31, the engine driver 32 controls the movement of the photoconductive drum 11, laser scanning system 15, the developing unit 16, the transfer unit 17, the fixing unit 18, the tractor unit 19 and the like to execute the electrophotographic image forming operation onto the fan-fold sheet 20, in accordance with the signals VIDEO and VSREQ outputted from the controller 31.

After the printing operation, with respect to a segment, has been finished (S103), the controller 31 examines whether the image information to be printed onto the succeeding segment is inputted or not (S105). If further information is inputted, the printing operation onto the succeeding segment (page) is performed (S103). If there is no image information inputted (S105), the type (page length) of the fan-fold sheet 20, which has been inputted through the operation panel (not shown), is detected (S107). That is, the controller 31 detects the page length of the fan-fold sheet 20, which is presently loaded in the printer 10.

If a page length of the fan-fold sheet 20 is detected to be 11 inches, or 5.5 inches, under the control of the engine driver 32, the feeding operation of the fan-fold sheet 20 is stopped when the last toner image of the present printing operation has been completed (S113). Then the printer 10 is in the stand-by state (S101).

If the page length of the fan-fold sheet 20 is not 11 inches, or 5.5 inches, a pair of marks M and M are printed on a segment to be discharged as a blank page under the control of the engine driver 32 as aforementioned. In this case, after the pair of marks have been transferred onto the segment, by counting the number of pulses outputted by the encoder (not shown), the trailing end of the marked segment (transverse perforation) is positioned at the fixing unit 18 (S113). At this stage, the printer is in the stand-by state again (S101).

As described above, according to the present invention, on a blank page of a continuous form recording sheet, which is to be passed through the transfer unit 17, and discharged without any information, a pair of marks are printed on the segment in accordance with the LD-ON signal generated by the engine driver 32 (S107). Thus the operator can distinguish the blank page due to the trouble of the printer, from the blank page due to the pause between two printing operations.

In the foregoing descriptions, the page length is limited to 11 inches, 5.5 inches, and therebetween. However, it is apparent that even If the page length is less than 5.5 inches or greater than 11 inches, the same operation can be applied, i.e., a pair of marks or the like can be printed on the segment which is to be discharged with no image corresponding to the image information being printed.

Further, in the printer embodying the present invention, if the page length of the continuous form sheet 20 is 11 inches, or 5.5 inches, segments carrying the unfixed toner image remain inside the printer, and no blank page is produced. However, there are printers that produce blank page even if the page length of the recording sheet corresponds to the distance between the transfer unit and the fixing unit. According to the present invention, in such printers, it is possible to print a pair of marks as described above on the blank pages.

In the embodiment, the marks are printed out of the image area corresponding to the image information to be printed. However, the positions of the marks are not limited to these positions, but can be any portion of the segment, e.g., the center of the segment, on the image area, and so on.

Furthermore, although, in the embodiment, a pair of rectangles are printed as marks, a single mark or more than two marks can be printed. The shape of a mark is not necessarily a rectangle, but any other shape or character will be possible.

Still further, in the embodiment, the LD-ON signal is generated by the engine driver 32. However, the printer can be constructed such that the controller 31 generates the LD-ON signal.

Furthermore, in the embodiment, the marks are printed with use of the electrophotographic imaging method. However, any other method such as a stamping method can be used.

According to the present invention, it becomes possible to determine whether the discharged page is not printed due to the pause between two different printing operations, or due to some trouble in the printing operation.

The present disclosure relates to subject matter contained in Japanease Utility Model Application No. HEI 4-010035, filed on Jan. 14, 1992, which is expressly incorporated herein by reference in its entirety.

What is claimed is:

1. An electrophotographic imaging device employing a continuous form sheet, the continuous form sheet having a plurality of segments divided by perforations, an image being formed on a predetermined area of each of said segments in accordance with image data, said imaging device having a transfer unit and a fixing unit positioned a predetermined distance from said transfer unit, and means for feeding said continuous form sheet from said transfer unit to said fixing unit, said imaging device comprising:

means for discriminating whether or not a segment of the continuous form sheet, at least a portion of which will be located between said transfer unit and said fixing unit when a printing job is completed, will have an image in the predetermined area, said feeding means stopping said segment between said transfer and fixing units when the printing job is completed; and means for marking said segment in response to an indication by said discriminating means that said segment stopped between said transfer and fixing units will not have an image in the predetermined area.

2. The electrophotographic imaging device according to claim 1, wherein said marking means prints a predetermined image on said segment.

3. The electrophotographic imaging device according to claim 2, wherein said marking means prints said predetermined image out of said predetermined area.

4. The electrophotographic imaging device according to claim 2, wherein said predetermined image comprises at least a predetermined character.

5. The electrophotographic imaging device according to claim 2, wherein said marking means prints said predetermined image with use of an electrophotographic imaging method.

6. The electrophotographic imaging device according to claim 1, further comprising means for disabling said discriminating means and said marking means when a page length of a sheet loaded in said device is a predetermined value.

7. The electrophotographic imaging device according to claim 1, said discriminating means comprising means for determining whether image data is input for printing.

8. The electrophotographic imaging device according to claim 1, said discriminating means comprising means for determining whether non-printing of a segment discharged out of said electrophotographic imaging device is caused by entry into a standby period of said electrophotographic imaging device based upon input of image data.

9. The electrophotographic imaging device according to claim 1, said marking means forming a mark on a segment of said continuous form sheet which is to be discharged out of said imaging device without an image being formed thereon.

10. The electrophotographic imaging device according to claim 1, wherein upon entry into a standby state, perforations between adjacent segments are positioned at said fixing unit.

11. The electrophotographic imaging device according to claim 1, said marking means marking a segment to be discharged from said imaging device without an image thereon in association with entry of said imaging device into a standby state in which said continuous form sheet is not fed.

12. The electrophotographic imaging device according to claim 1, said discriminating means further discriminating whether a predetermined relationship exists between a length of each of said plurality of segments and said predetermined distance between said transfer and said fixing units, said marking means marking said segment when said relationship does not exist.

13. An electrophotographic imaging device employing a continuous form sheet, the continuous form sheet having a plurality of segments divided by perforations, an image being formed on a predetermined area of each of said segments in accordance with image data, said imaging device comprising a transfer unit at which a toner image corresponding to said image data is transferred onto a segment, a fixing unit spaced a predetermined distance from said transfer unit at which the toner image is fixed onto the segment, and means for feeding said continuous form sheet from said transfer unit to said fixing unit, said imaging device having a printing state in which an image corresponding to said image data is formed on a segment as the segment is fed by said feeding means, and a standby state in which images are not formed and said continuous form is not fed by said feeding means, said imaging device further comprising:

means for discriminating, when said device is in the standby state, whether a predetermined relationship exists between a length of each said plurality of segments and a distance between said transfer and fixing units; and means for marking said segment if it is discriminated by said discriminating means that said predetermined relationship does not exist.

14. The electrophotographic imaging device according to claim 13, wherein said marking means prints a predetermined image on said segment.

15. The electrophotographic imaging device according to claim 14, wherein said marking means prints said predetermined image out of said predetermined area.

16. The electrophotographic imaging device according to claim 14, wherein said predetermined image comprises at least a predetermined character.

17. The electrophotographic imaging device according to claim 14, wherein said marking means prints said predetermined image with use of an electrophotographic imaging method.

18. The electrophotographic imaging device according to claim 13, further comprising means for disabling said discriminating means and said marking means when a page length of a sheet loaded in said device is a predetermined value.

19. The electrophotographic imaging device according to claim 13, said discriminating means comprising means for determining whether image data is input for printing.

20. The electrophotographic imaging device according to claim 13, said marking means forming a mark on a segment of said continuous form sheet which is to be discharged out of said imaging device without an image being formed thereon.

21. The electrophotographic imaging device according to claim 13, wherein that upon entry into the standby state, perforations between segments are positioned at said fixing unit.

22. The electrophotographic imaging device according to claim 13, said marking means marking a segment to be discharged from said imaging device without an image thereon in association with entry of said imaging device into the standby state.

* * * * *

UNITED STATES PATENT AND TRADEMARK OFFICE
CERTIFICATE OF CORRECTION

PATENT NO. : 5,450,164
DATED : September 12, 1995
INVENTOR(S) : K. NEGISHI et al.

It is certified that error appears in the above-indentified patent and that said Letters Patent is hereby corrected as shown below:

On the Title page, item [75], "Inventors", line 2 change "Tsurugashima" to ---Saitama-Ken---.

Signed and Sealed this

Third Day of September, 1996

Attest:

BRUCE LEHMAN

Attesting Officer          Commissioner of Patents and Trademarks